(12) United States Patent
Oh et al.

(10) Patent No.: US 11,983,348 B1
(45) Date of Patent: May 14, 2024

(54) VIDEO CONFERENCING MONITOR WITH AN ADVANCED PANEL DESIGN

(71) Applicant: DELL PRODUCTS L.P., Round Rock, TX (US)

(72) Inventors: Guentaek Oh, Singapore (SG); KyungEun Lee, Singapore (SG); BongJun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/191,451

(22) Filed: Mar. 28, 2023

(51) Int. Cl.
*G06F 3/041* (2006.01)
*G02F 1/1675* (2019.01)

(52) U.S. Cl.
CPC .......... *G06F 3/0412* (2013.01); *G02F 1/1675* (2019.01); *G06F 3/0416* (2013.01)

(58) Field of Classification Search
CPC ...... G06F 3/0412; G06F 3/0416; G02F 1/167; G02F 1/1675; G02F 1/16753; G09G 3/344
See application file for complete search history.

(56) References Cited

U.S. PATENT DOCUMENTS

| | | | | |
|---|---|---|---|---|
| 7,327,352 B2 * | 2/2008 | Keefer | ..................... | G06F 3/045 178/18.05 |
| 10,955,958 B2 * | 3/2021 | Yukawa | ................ | G06F 3/0488 |
| 2004/0012572 A1 * | 1/2004 | Sowden | .............. | G06F 3/03547 345/173 |
| 2005/0088417 A1 * | 4/2005 | Mulligan | ............ | G06F 3/04886 345/173 |
| 2005/0146509 A1 * | 7/2005 | Geaghan | ............... | G06F 3/0446 345/173 |
| 2006/0238517 A1 * | 10/2006 | King | ..................... | G06F 1/1637 345/173 |
| 2007/0018967 A1 * | 1/2007 | Wang | .................... | G06F 1/1601 345/173 |
| 2010/0110019 A1 * | 5/2010 | Ozias | .................. | G06F 3/03547 345/173 |
| 2010/0251115 A1 * | 9/2010 | Vega | .................... | G06F 3/04886 345/173 |
| 2011/0242001 A1 * | 10/2011 | Zhang | ..................... | G06F 3/044 345/173 |
| 2012/0139852 A1 * | 6/2012 | Huang | .................. | G06F 3/0412 345/173 |
| 2012/0154408 A1 * | 6/2012 | Yukawa | ................ | G06F 3/0416 345/173 |
| 2014/0204027 A1 | 7/2014 | Walline et al. | | |
| 2014/0218853 A1 * | 8/2014 | Pance | ................... | G06F 1/1673 361/679.4 |
| 2014/0313156 A1 * | 10/2014 | Tenuta | ................ | G06F 3/04883 345/174 |
| 2014/0340364 A1 * | 11/2014 | Tang | ....................... | G06F 3/042 345/175 |

(Continued)

*Primary Examiner* — Kenneth Bukowski
(74) *Attorney, Agent, or Firm* — Larson Newman, LLP (57) ABSTRACT

A display for an information handling system includes a top bezel, a printed circuit board, and a bottom bezel. The top bezel has a first width. The printed circuit board is in physical communication with the top bezel, and includes a touch circuit. The touch circuit performs one or more operations based on different touch operations. The bottom bezel has a second width, and multiple touch electrodes. Each of the touch electrodes communicates with the touch circuit.

15 Claims, 7 Drawing Sheets

(56) References Cited

U.S. PATENT DOCUMENTS

| | | | |
|---|---|---|---|
| 2015/0212639 A1* | 7/2015 | Wallace | G06F 3/04883 345/173 |
| 2018/0067639 A1* | 3/2018 | Balaram | G04G 21/08 |
| 2021/0117035 A1* | 4/2021 | Kim | G06V 40/1306 |
| 2022/0308697 A1* | 9/2022 | Liu | G06F 3/0443 |

* cited by examiner

VIDEO CONFERENCING MONITOR WITH AN ADVANCED PANEL DESIGN

FIELD OF THE DISCLOSURE

The present disclosure generally relates to information handling systems, and more particularly relates to a video conferencing monitor with an advanced panel design.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display for an information handling system includes a top bezel, a printed circuit board, and a bottom bezel. The top bezel has a first width. The printed circuit board is in physical communication with the top bezel, and includes a touch circuit. The touch circuit may perform one or more operations based on different touch operations. The bottom bezel has a second width, and multiple touch electrodes. Each of the touch electrodes may communicate with the touch circuit.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
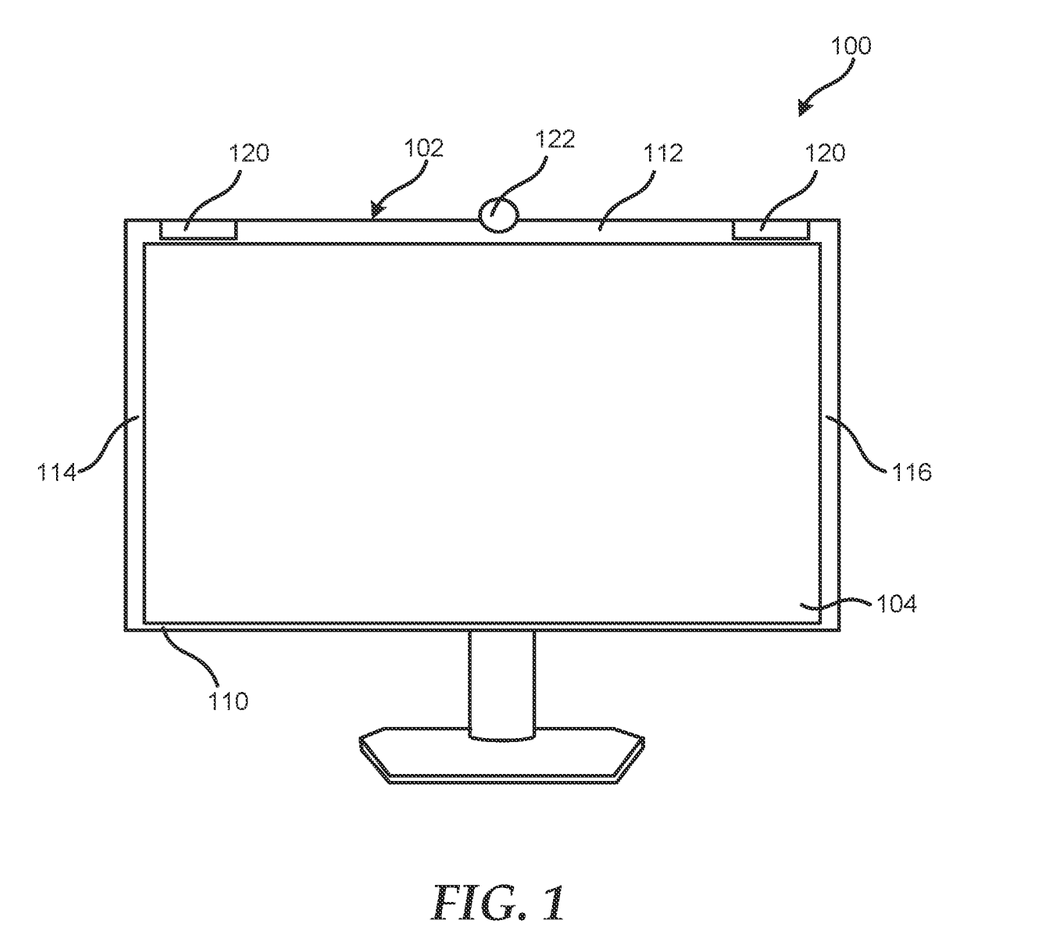
FIGS. 1-3 are diagrams of a display of an information handling system according to at least one embodiment of the present disclosure.
Figure 2:
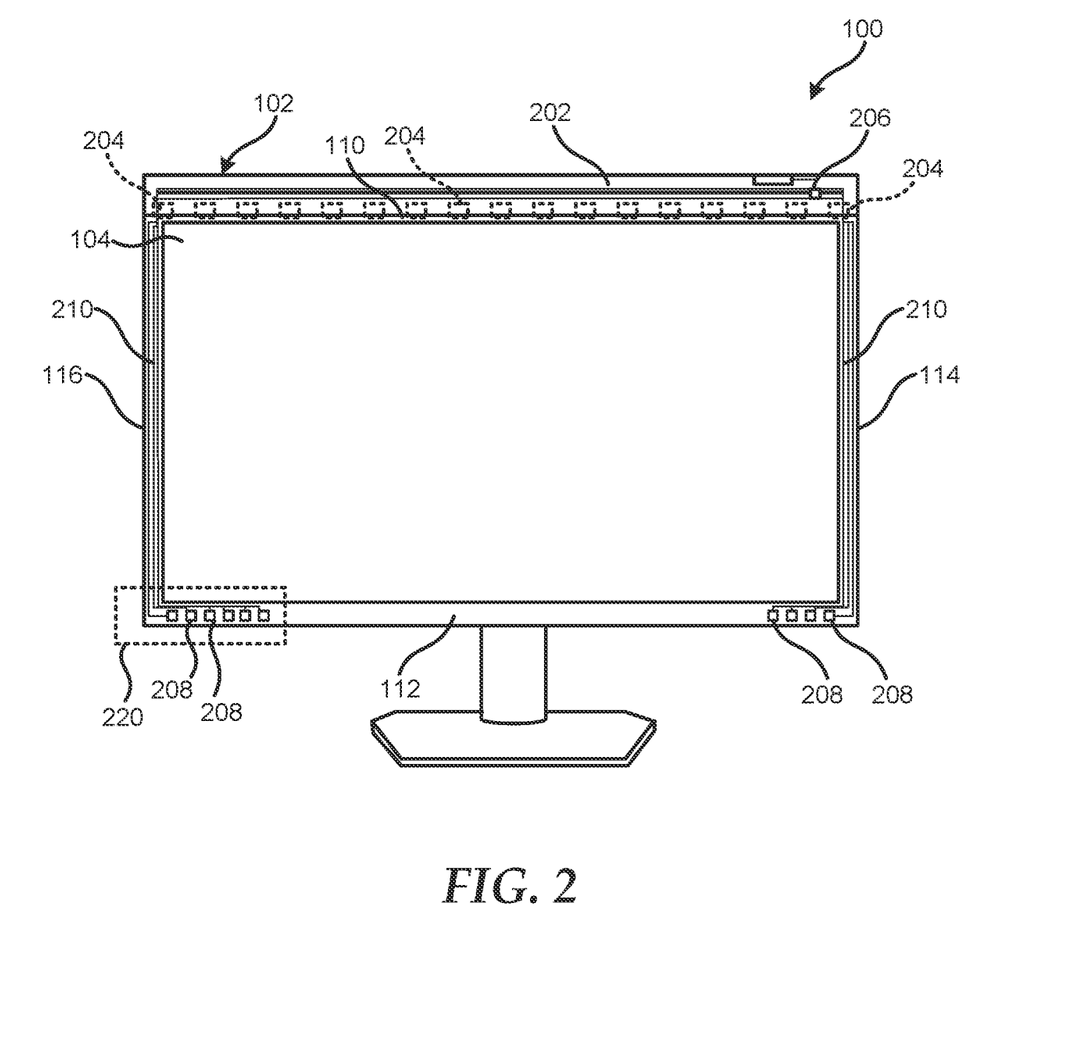

FIGS. 1 and 2 illustrate diagrams of a display 100 of an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Display 100 includes a front panel 102 and a display panel 104. Front panel 102 includes bezels 110, 112, 114 and 116. In an example, the width of bezel 110 may be smaller than the width of bezel 112. In certain examples, display 100 may be an 'all-in-one' system, such that the display may include the components to display images, and additional components to perform operations of an information handling system, such as information handling system 400 of FIG. 4. In an example, display 100 may be any suitable display such as a 4SNB narrow panel. In certain examples, the width of bezel 112 may be a particular size so that speakers 120 may be located within the bezel, and a camera 122 may be connected to the bezel. Speakers 120 and camera 122 may be utilized during a teleconference or other video communication. In an example, display 100 may include additional components without varying from the scope of this disclosure.

Referring now to FIG. 2, display 100 may be rotated or reversed, such that bezel 110 is located on top of display panel 102 and bezel 112 is located on the bottom of the display panel. Display 100 further includes a printed circuit board (PCB) 202 placed in physical communication with bezel 110. Display 100 also includes multiple communication interfaces 204, a touch integrated circuit (IC) 206, and multiple buttons and light emitting diodes (LEDs) 208. While buttons and LEDs 208 are illustrated on both edges of bezel 112, one of ordinary skill in the art would recognize that the buttons and LEDs may be located on a single edge of the bezel without varying from the scope of this disclosure.

In an example, buttons and LEDs 208 may communicate with touch IC 206 via communication channels 210 and communication interfaces 204. Communication interfaces 204 may be any suitable components such as chips-on-film (COFs). In certain examples, touch IC 206 may receive one or more signals from buttons and LEDs 208. The signals may be any suitable video conferencing signals including, but not limited to, mute/unmute, video/no video, volume up, volume down, and hang up/disconnect. In response to one of the video conferencing signals, touch IC 206 may communicate with a processor within monitor 100 or an information handling system to cause an associated operation to be performed. For example, if a mute/unmute button 208 within bezel 212 is pressed, touch IC 206 may cause a processor to toggle a state of a microphone for the information handling system. In response to an operation being performed, the processor may change the color of the associated button and LED 208. Continuing with the example above, after the state of the microphone has been toggled, the processor may change a color of button LED 208.

Figure 3:
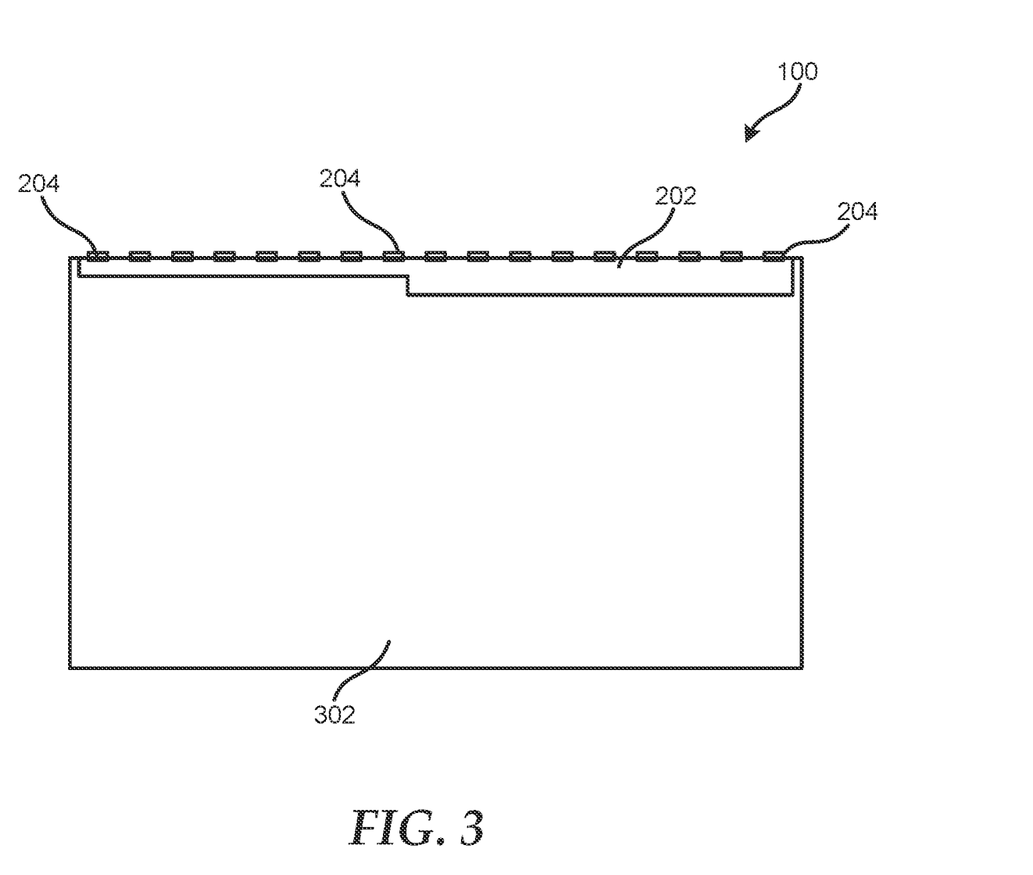

In certain examples, communication interfaces 204 and PCB 202 may fold over a top surface of display 100, such that PCB 202 may be placed in physical communication with a back surface 302 as shown in FIG. 3. In an example, communication interfaces may be mounted on a flexible film that may enable communication between buttons 208 and PCB 202 as described with respect to FIG. 4 below.

Figure 4:
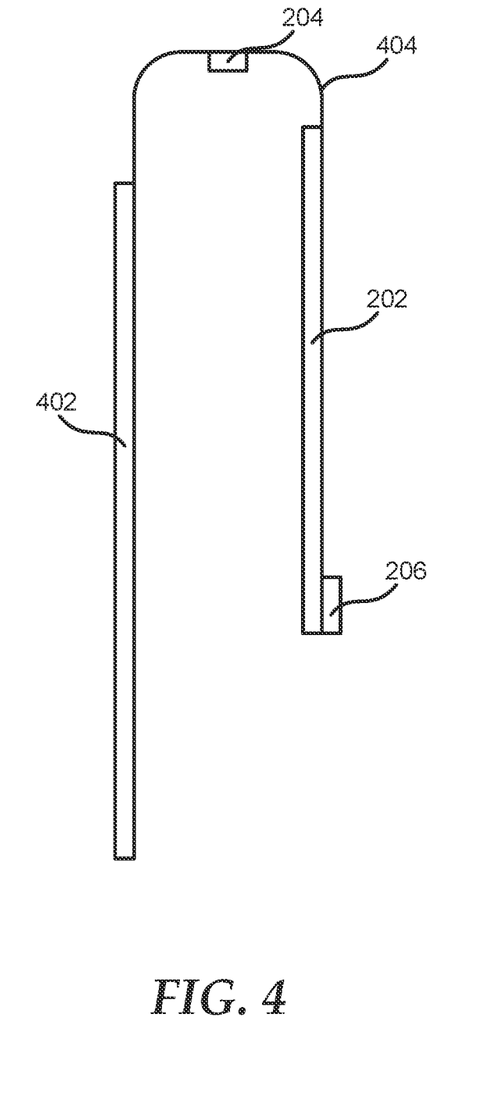
FIG. 4 is a diagram illustrating a glass portion, COF portion, and printed circuit board portion of a display according to at least one embodiment of the present disclosure.

FIG. 4 is a diagram illustrating a glass 402, a film 404, PCB 202, communication interface, such as a COF, 204, and touch IC 206 according to at least one embodiment of the present disclosure. In an example, film 404 may be in physical communication with glass 402 of a display, such as display 100, and with PCB 202. As illustrated, film 404 may be flexible such that the film may bend over a portion of display 100, such as bezel 110 of FIG. 2. Communication interface 204 may be mounted on film 404 and provide communication between buttons 208 and touch IC 206 as described above with respect to FIG. 2.

Figure 5:
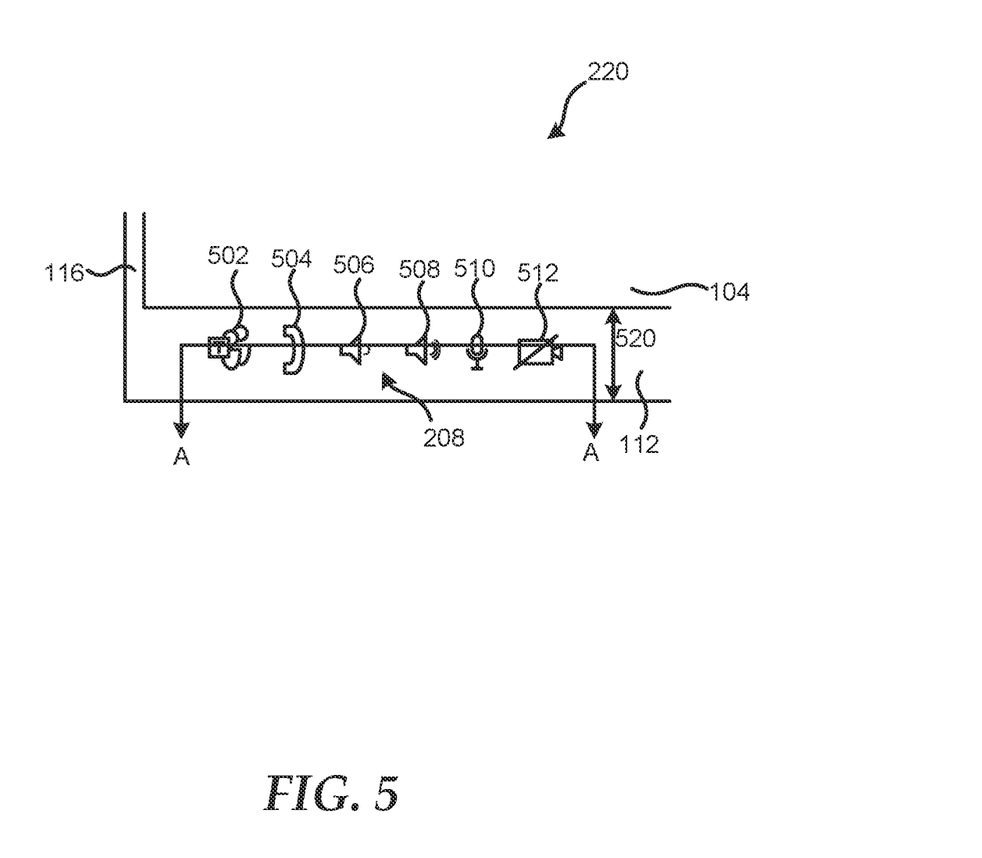
FIG. 5 is a diagram of a portion of a display for an information handling system according to at least one embodiment of the present disclosure.

FIG. 5 illustrates portion 220 of display 100 according to at least one embodiment of the present disclosure. Portion 220 of display 100 includes display panel 104 and bezels 112 and 114. Buttons 208 may be incorporated into bezel 112, and the buttons may be any suitable buttons associated with teleconferencing. For example, buttons 208 may include, but are not limited to, a teleconference button 502, a connect/disconnect button 504, a volume down button 506, a volume up button 508, a mute/unmute button 510, and video on/off button 512.

In an example, width 520 of bezel 112 may be any particular size so that buttons 502, 504, 506, 508, 510, and 512 may be incorporated into the bezel. For example, width 520 of bezel 112 may be greater than widths of similar bezels of similar monitors or displays that do not have buttons 502, 504, 506, 508, 510, and 512 incorporated therein. In certain examples, buttons 502, 504, 506, 508, 510, and 512 may be any suitable type of buttons, such as capacitive touch buttons. Additionally, each of buttons 502, 504, 506, 508, 510, and 512 may include a LED portion to indicate a state of the button and corresponding operation. In an example, when one of buttons 502, 504, 506, 508, 510, and 512 is activated, touch IC 206 of FIG. 2 and a processor may perform one or more operations associated with that button. A portion of display 100 taken along line A-A will be described with respect to FIG. 6 below.

Figure 6:
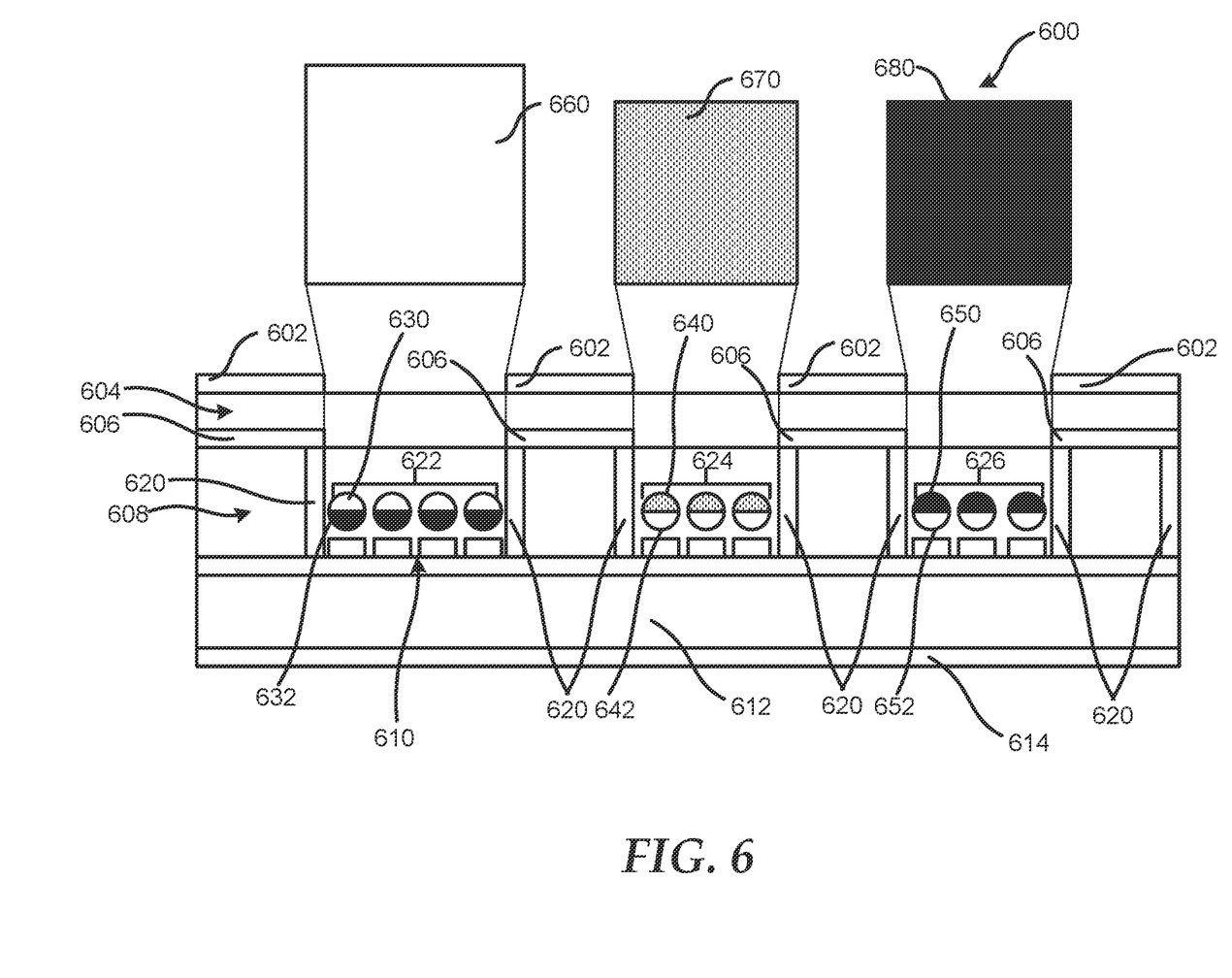
FIG. 6 is a cross-sectional view of a portion of a display according to at least one embodiment of the present disclosure.

FIG. 6 a cross section 600 of a portion of display 100 of FIG. 1 according to at least one embodiment of the present disclosure. Cross section 600 of display 100 illustrates a top polarizer 602, a thin-film transistor (TFT) glass 604, a touch electrode layer 606, a liquid crystal (LC) layer 608 an indium tin oxide (ITO) layer 610, a color filter (CF) glass 612, and a bottom polarizer 614. Display 100 includes multiple sealants 620 and multiple groups electronic ink balls 622, 624, and 626. In an example, polarizer 602 may be a patterned polarizer, touch electrode layer 606 may be a patterned touch electrode, and ITO layer 610 may be patterned ITO. In certain examples, the patterned ITO layer 610 may be utilized to control the electronic ink balls 622, 624, and 626 through voltage.

In an example, polarizer 602 may be part of bezel 112 and buttons 502, 504, 506, 508, 510, and 512 may be located at the gaps within the patterned polarizer. In certain examples, each electronic ink ball within groups 622, 624, and 626 may be any suitable shape capable of flipping or rotating from one side to the other, such as a sphere, a prolate spheroid, or the like. In certain examples, ITO layer 610 may be referred to as a patterned charge component. In an example, each of patterned charge components 610 may be a different ITO component, such that each of the components may correspond to a different electronic ink ball of groups 622, 624, and 626. In certain examples, sealants 620 may be located along LC layer 608 to separate each group of electronic ink balls 622, 624, and 626.

In certain examples, each group of electronic ink balls 622, 624, and 626 and patterned charge components 610 may extend the length and width of each gap within patterned polarizer 602 and patterned touch electrode 606. For example, group of electronic ink balls 622, 624, and 626 may be bounded on each side by a different sealant 620. In an example, each electronic ink ball of group 622 may include two portions 630 and 632, such that one portion is a first color and the other portion is a second color. For example, an electronic ink ball 622 may include one portion that is white in color and the other portion is black in color. In an example, each electronic ink ball of group 624 may include two portions 640 and 642, such that one portion is a first color and the other portion is a second color. For example, an electronic ink ball 624 may include one portion that is green in color and the other portion is red in color. Similarly, each electronic ink ball of group 626 may include two portions 650 and 652, such that one portion is a first color and the other portion is a second color. For example, an electronic ink ball 626 may include one portion that is black in color and the other portion is white in color.

Additionally, each portion of an electronic ink ball in groups 622, 624, and 626 may have a different magnetic charge. For example, a first portion 630 of electronic ink ball 622 may have either a positive magnetic charge or a negative magnetic charge, and the other portion 632 may have the opposite charge as compared to the first color portion. In this example, either portion of each electronic ink ball in groups 622, 624, and 626 may be positioned to face top polarizer 602 of display 100 based on a charge placed on each of patterned charge components 610 as will be described below.

Figure 7:
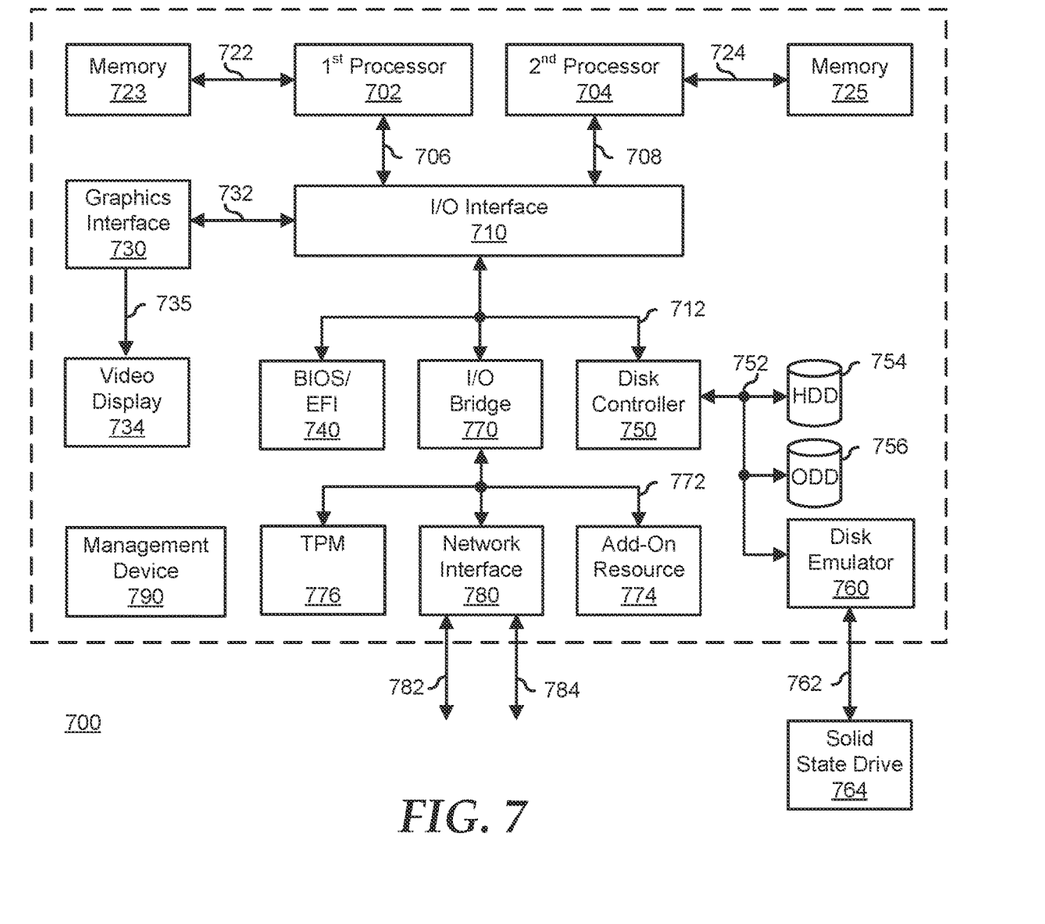
FIG. 7 is a block diagram of a general information handling system according to an embodiment of the present disclosure.

Upon power up of display 100 and the associated information handling system, a processor, such as processor 702 or 704 of FIG. 7, may provide one or more voltages to patterned charge components 610, which in turn may cause each group of electronic ink balls 622, 624, and 626 to be positioned in a default state. In certain examples, a default state for a group of electronic ink balls 622, 624, and 626 may cause a particular color portion of each electronic ink ball of a group to face polarizer 602. For example, the default state for a group electronic ink balls 622 associated with teleconference button 502 may be for a white portion 630 to face patterned polarizer 602. While only a single line of electronic ink balls of group 622 is illustrated, the electronic ink balls may cover an entire area of a gap between patterned polarizer 602 as illustrated by portion 660. Thus, when group of electronic ink balls 622 are in the default state, the entire portion 660 may be white in color.

In response to touch electrode 606 for conference button 502 being pressed, a signal may be provided to touch IC 206. In an example, touch electrode 606 may be any suitable touch component, such as a capacitive touch component. Based on the signal from touch electrode 606, touch IC 206 may cause a processor of display 100 or an associated information handling system to toggle the state of teleconference button 502. The processor may then change the polarity of patterned charge components 610 associated with the group of electronic ink balls 622 for the teleconference button 502. In an example, the change of polarity in patterned charge components 610 may cause the electronic ink balls 622 to flip to a black portion of each of the electronic ink balls to face patterned polarizer 602. Thus, each time touch electrode 606 is pressed for teleconference button 502, touch IC 206 and the processor may perform an action within information handling system and change the portion of each of electronic ink balls 622 in that group that face patterned polarizer 602.

In an example, the default state for a group electronic ink balls 624 associated with connect/disconnect button 504 may be for a red portion 640 of each of the electronic ink balls to face patterned polarizer 602 based on the connection for the information handling system being defaulted to disconnected. In this example, the light may enter within bezel 112 via the gaps in patterned polarizer 602, reflect off portion 640 of each of electronic ink balls 624 facing the polarizer, such as the red portion, and the color of the portion may be visible through the associated LED button 504 as illustrated by portion 670. Thus, when group of electronic ink balls 624 are in the default state, the entire portion 670 may be red in color.

In response to touch electrode 606 for connect/disconnect button 504 being pressed, a signal may be provided to touch IC 206. Based on the signal from touch electrode 606, touch IC 206 may cause a processor of display 100 or an associated information handling system to toggle the state of connect/disconnect button 504. The processor may then change the polarity of patterned charge components 610 associated with the group of electronic ink balls 624 for the connect/disconnect button 504. In an example, the change of polarity in patterned charge components 610 may cause the electronic ink balls 624 to flip to a green portion 642 of each of the electronic ink balls to face patterned polarizer 602. Thus, each time touch electrode 606 is pressed for connect/disconnect button 504, touch IC 206 and the processor may perform an action within information handling system and change the portion of each of electronic ink balls 624 in that group that face patterned polarizer 602.

In certain examples, the default state for a group electronic ink balls 626 associated with volume down button 506 may be for a black portion 650 of each of the electronic ink balls to face patterned polarizer 602. While only a single line of electronic ink balls of group 626 is illustrated, the electronic ink balls may cover an entire area of a gap between patterned polarizer 602 as illustrated by portion 680. Thus, when group of electronic ink balls 626 are in the default state, the entire portion 680 may be black in color.

In response to touch electrode 606 for volume down button 506 being pressed, a signal may be provided to touch IC 206. Based on the signal from touch electrode 606, touch IC 206 may cause a processor of display 100 or an associated information handling system to toggle the state of volume down button 506. The processor may then change the polarity of patterned charge components 610 associated with the group of electronic ink balls 626 for the volume down button 506. In an example, the change of polarity in patterned charge components 610 may cause the electronic ink balls 626 to flip to a white portion 652 of each of the electronic ink balls to face patterned polarizer 602. Thus, each time touch electrode 606 is pressed for volume down button 506, touch IC 206 and the processor may perform an action within information handling system and change the portion of each of electronic ink balls 626 in that group that face patterned polarizer 602. While the operation of touch IC 206, the different groups of electronic ink balls 622, 624, and 626, patterned charge components 610, patterned touch electrode 206, and a processor of display 100 or an information handling system have been described for a couple of buttons 502, 504, and 506, substantially similar operations may be performed for every button 208 without varying from the scope of this disclosure.

FIG. 7 shows a generalized embodiment of an information handling system 700 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732 and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 3394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712 or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700.

Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A display for an information handling system, the display comprising:
    a top bezel having a first width;
    a printed circuit board in physical communication with the top bezel, the printed circuit board including a touch circuit to perform one or more operations based on different touch signals; and
    a bottom bezel having a second width, the bottom bezel including a plurality of touch electrodes, wherein each of the touch electrodes are configured to communicate with the touch circuit, wherein the bottom bezel further includes: a first group of electronic ink balls including a first electronic ink ball, wherein the first electronic ink ball includes a first portion having a first color and a second portion having a second color.

2. The display of claim 1, wherein the bottom bezel further includes: a patterned polarizer including a plurality of polarizer portions, wherein each different touch electrode is located behind a different polarizer portion.

3. The display of claim 1, wherein the bottom bezel further includes: patterned charge components, wherein each of the patterned charge components is associated with a different electronic ink ball of the first group of electronic ink balls.

4. The display of claim 3, wherein the first portion of the first electronic ink ball is attracted to a first charge component of the patterned charge component when a first charge is provided to the first charge component.

5. The display of claim 4, wherein the second portion of the first electronic ink ball is attracted to the first charge component when a second charge is provided to the first charge component.

6. The display of claim 1, wherein the bottom bezel further includes: a second group of electronic ink balls including a second electronic ink ball, wherein the second electronic ink ball includes a third portion having a third color and a fourth portion having a fourth color.

7. The display of claim 6, wherein the first group of electronic ink balls is associated with a first touch electrode of the touch electrodes, and the second group of electronic ink balls is associated with a second touch electrode of the touch electrodes.

8. A display for an information handling system, the display comprising:
    a top bezel having a first width;
    a printed circuit board in physical communication with the top bezel, the printed circuit board including a touch circuit to perform one or more operations based on different touch signals; and
    a bottom bezel having a second width, wherein the second width is greater than the first width, the bottom bezel including:
        a plurality of touch electrodes, wherein each of the touch electrodes are configured to communicate with the touch circuit;
        a patterned polarizer including a plurality of polarizer portions, wherein each different touch electrode is located behind a different polarizer portion; and
        a first group of electronic ink balls including a first electronic ink ball, wherein the first electronic ink ball includes a first portion having a first color and a second portion having a second color.

9. The display of claim 8, wherein the bottom bezel further includes: patterned charge components, wherein each of the patterned charge components is associated with a different electronic ink ball of the first group of electronic ink balls.

10. The display of claim 9, wherein the first portion of the first electronic ink ball is attracted to a first charge component of the patterned charge component when a first charge is provided to the first charge component.

11. The display of claim 10, wherein the second portion of the first electronic ink ball is attracted to the first charge component when a second charge is provided to the first charge component.

12. The display of claim 8, wherein the bottom bezel further includes: a second group of electronic ink balls including a second electronic ink ball, wherein the second electronic ink ball includes a third portion having a third color and a fourth portion having a fourth color.

13. The display of claim 12, wherein the first group of electronic ink balls is associated with a first touch electrode of the touch electrodes, and the second group of electronic ink balls is associated with a second touch electrode of the touch electrodes.

14. A display for an information handling system, the display comprising:
    a top bezel having a first width;
    a printed circuit board in physical communication with the top bezel, the printed circuit board including a touch circuit to perform one or more operations based on different touch signals; and a bottom bezel having a second width greater than the first width, the bottom bezel including:
- a plurality of touch electrodes each configured to communicate with the touch circuit, wherein each of the touch electrodes provides a different one of the touch signals to the touch circuit;
- a patterned polarizer including a plurality of polarizer portions, wherein each touch electrode is located behind a different polarizer portion;
- a first group of electronic ink balls including a first electronic ink ball, wherein the first electronic ink ball includes a first portion having a first color and a second portion having a second color; and
- a second group of electronic ink balls including a second electronic ink ball, wherein the second electronic ink ball includes a third portion having a third color and a fourth portion having a fourth color, wherein the first group of electronic ink balls is associated with a first touch electrode of the touch electrodes, and the second group of electronic ink balls is associated with a second touch electrode of the touch electrodes.

15. The display of claim 14, wherein the bottom bezel further includes: patterned charge components, wherein each of the patterned charge components is associated with a different electronic ink ball of the first group of electronic ink balls, wherein the first portion of the first electronic ink ball is attracted to a first charge component of the patterned charge component when a first charge is provided to the first charge component.

* * * * *